United States Patent [19]

Keirsey

[11] Patent Number: 4,628,688

[45] Date of Patent: Dec. 16, 1986

[54] SOLID FUEL RAMJET FLOW CONTROL DEVICE

[75] Inventor: James L. Keirsey, Silver Spring, Md.

[73] Assignee: The United States of America as represented by the Secretary of the Navy, Washington, D.C.

[21] Appl. No.: 527,158

[22] Filed: Aug. 29, 1983

[51] Int. Cl.⁴ ............................................... F02K 7/10
[52] U.S. Cl. ........................................ 60/251; 60/249; 60/253; 60/270.1
[58] Field of Search .................... 60/270.1, 249, 253, 60/251

[56] References Cited

U.S. PATENT DOCUMENTS 3,844,118 10/1974 Wilkinson .............................. 60/251
4,031,698 6/1977 Humphrey ............................ 60/251
4,052,846 10/1977 Schadow ............................... 60/251

*Primary Examiner*—Donald P. Walsh
*Attorney, Agent, or Firm*—Kenneth E. Walden; Donald J. Breh

[57] ABSTRACT

A device for controlling the rate of fuel generation in a solid fuel ramjet engine having a translating tube within the fuel grain and air inlet for continuously changing the distribution of air over the fuel grain in response to air mass flow. The distribution of air effects the aerodynamic shear interaction between the air and solid fuel which causes a change in burn rate.

10 Claims, 3 Drawing Figures

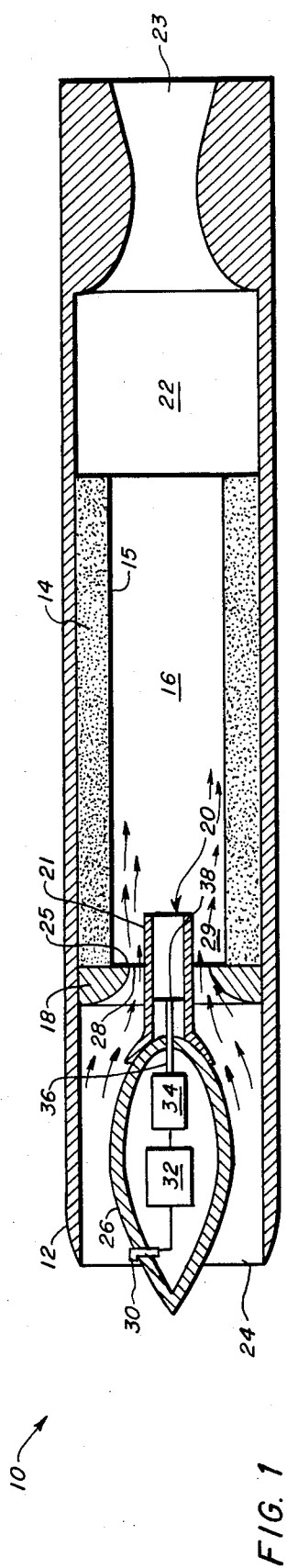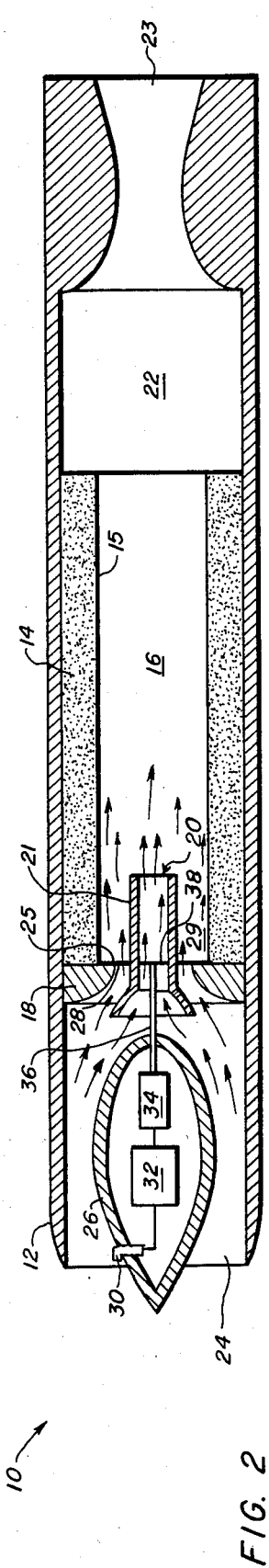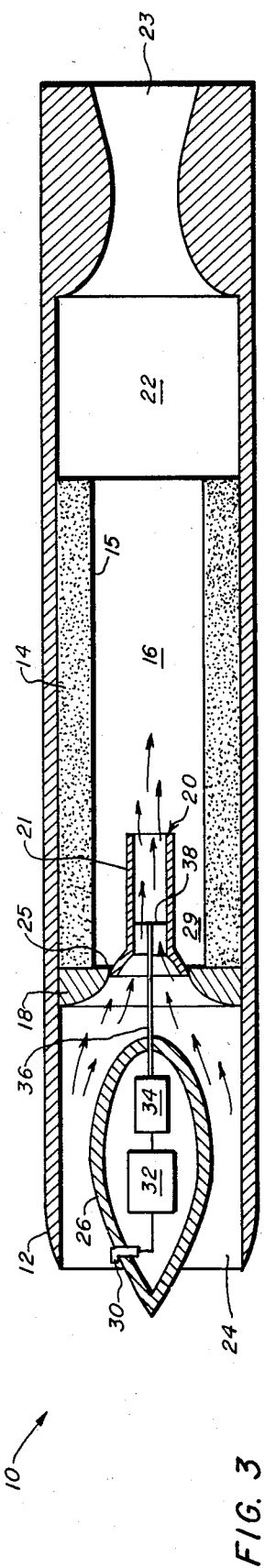

4,628,688

SOLID FUEL RAMJET FLOW CONTROL DEVICE

BACKGROUND OF THE INVENTION

This invention relates to solid fuel ramjet engines and more particularly to a device for controlling the generation of fuel rich combustion gases from the solid fuel. In still greater particularity the invention relates to a device for controlling the generation of fuel by changing the distribution of air within the solid fuel combustor in response to changes in engine and flight conditions encountered in operation.

Solid fuel ramjet engines, whether brought to operational speed by a booster engine or air dropped from a vehicle, depend upon the introduction of air into the engine due to its forward motion. Thus the term ramjet is used. As the ram air passes through a solid fuel grain within a combustor, fuel rich gases generated by the solid fuel react with oxygen in the air in a combustion chamber aft of the combustor and pass out of the engine via a nozzle producing thrust.

The rate at which the fuel rich gases are generated from the solid fuel grain, in general, depends on the fuel grain surface area, temperature and pressure within the combustor and the mass rate of air flow over the fuel grain. Due to wide and uncontrollable flight conditions encountered by the engine during operation, the air mass flow varies considerably and not necessarily in a predictable manner. Without some means of controlling the burn rate of the solid fuel in response to changes in air mass flow excessively rich combustion chamber conditions will exist, which is very wasteful of fuel and reduces the range of the vehicle. Additionally, engine variables, such as changes in the solid fuel grain area, thrust, and combustor temperatures and pressures, as well as missile flight parameters, such as Mach number and angle of attack necessitate changes in fuel burn rate to maintain the variable within acceptable limits.

Heretofore, efforts have been directed to engine configurations that either bypass a portion of the ram air around the solid fuel combustor or vent a portion of the air outside of the vehicle. In both cases the object is to reduce the air flow into the solid fuel combustor and reduce the burn rate of the fuel.

Another common technique used to control the uniformity, but not directly the rate of fuel burning, includes a tube-in-hole arrangement, whereby a tube is inserted into the fuel grain inlet. The tube splits the air flow and improves the uniformity of burning of the solid fuel grain. Typical arrangements are disclosed in U.S. Pat. Nos. 4,031,691 and 4,052,846.

A device for controlling the rate of fuel burning, in the combustor, but not necessarily the uniformity thereof, is disclosed in U.S. Pat. No. 3,844,118, wherein a valve moves to restrict the air inlet to the fuel grain in response to engine conditions, rather than ambient air conditions, to vary the total mass flow of air into the solid fuel combustor.

The tube-in-hole technique has proven effective in improving the distribution of air within the solid fuel combustor and uniformity of the fuel burn; however, these devices do not provide for continuously changing the distribution of air within the combustor in response to instantaneous changes in mass air flow or engine and missile parameters encountered in flight. Rather, the tube-in-hole is designed to give more uniform burning for a nominal flight condition, and over rich fuel conditions still present a problem.

The valve arrangement set out, and other devices for throttling the air into the combustor, while effective in changing the total air flow through the combustor in a predetermined manner, and, thereby achieving a change in fuel burn rate, do not achieve the change in fuel burn rate by controlling the distribution of air over the fuel grain surface in response to instantaneous changes in air mass flow encountered. Rather, the valve arrangement responds only to engine variables, such as increasing fuel grain area or thrust, to throttle the air flow into the combustor, causing fuel production to increase or decrease, thereby achieving the desired result.

SUMMARY OF THE INVENTION

Accordingly, it is an object of the invention to provide for a more fuel efficient solid fuel ramjet engine.

Another object of the invention is to provide for a solid fuel ramjet engine having increased range.

A further object of the invention is to provide for a solid fuel ramjet engine that is uneffected by changing air mass flow conditions encountered over its flight path.

A still further object of the invention is to provide for means of continuously changing the fuel burn rate in the combustor of a solid fuel ramjet engine as a function of instantaneous mass air flow, engine, and missile flight conditions.

A still further object of the invention is to provide for means of alleviating excessively rich conditions in a ramjet engine.

The objects of the invention are achieved, and the shortcomings of the prior art are overcome, by providing for a solid fuel ramjet engine having means for increasing or decreasing the generation of fuel rich combustion gases as a function of changes in air mass flow rate into the solid fuel combustor, engine variables or missile flight conditions over its flight path. The fuel flow device includes a translating tube inserted into the air inlet of the fuel combustor for splitting the air flow into two portions, one directed along the fuel grain and the other directed through the center of the grain. A servomechanism continuously moves the tube longitudinally into and out of the fuel grain in response to instantaneous changes in the specific parameter being sensed, such as air mass flow as sensed by a sensor mounted in the air inlet. The position of the tube changes the airflow distribution and aerodynamic shear interaction of the air flow over the fuel grain surface which causes a change in the rate of fuel regression as a function of the instantaneous condition sensed.

BRIEF DESCRIPTION OF THE DRAWINGS

FIG. 1 is a longitudinal cross sectional view of a missile having a solid fuel ramjet engine showing the preferred embodiment in use during a period for generating high fuel flow from the solid fuel.

FIG. 2 is a longitudinal cross sectional view of a missile having a solid fuel ramjet engine showing the preferred embodiment in use during a period for generating an intermediate fuel flow from the solid fuel.

FIG. 3 is a longitudinal cross sectional view of a missile having a solid fuel ramjet engine showing the preferred embodiment in use during a period for generating reduced fuel flow from the solid fuel.

DETAILED DESCRIPTION OF THE PREFERRED EMBODIMENT

Referring to FIG. 1, there is shown a missile 10 having an outer case 12 internally lined with a solid fuel charge 14 having an inner grain surface 15 and an ignition initiation device, not shown. Charge 14, in the embodiment shown, is tubular forming a solid fuel combustor section 16 within its interior volume. An air inlet injector plate 18 is located adjacent fuel charge 14 and cooperates with a translating tube 20, as set out below, to define an air inlet to combustor 16. Translating tube 20 is mounted coaxially within the circular opening in plate 18 and extends into combustor chamber 16 forming an annular volume 29 between tube exterior surface 21 and inner surface 15 of charge 14. Missile 12 includes a typical combustion chamber 22 within which the fuel rich combustion products generated in combustor 16 and oxygen from the air react. The reacted products expand from a nozzle 23 in well known fashion to create thrust.

Missile 12 includes an air inlet 24 for admitting ram air into the engine. The air is compressed by a diffuser 26 mounted within case 12 forward of air injector plate 18. As shown in the Figures, diffuser 26 and injector plate 18 are arcuate shaped at the region adjacent one another, forming a smooth contoured path for the compressed air to enter the region near the injector plate opening. Translating tube 20 is shaped on its end adjacent the diffuser so as to mate therewith when in a retracted position, as shown in FIG. 1. The outside diametrical dimension of the expanded end of translating tube 20 is such that, when the tube is in the extended, minimum fuel, position, shown in FIG. 3, the periphery of the expanded end is contiguous with the inside diametrical surface 25 of injector plate 18. It can be seen from the figures that when the translating tube is in the retracted, maximum fuel position, shown in FIG. 1, all of the ram air passes into combustor 16 through annuluses 28 and 29.

As shown in FIG. 3, when the translating tube is moved to the extended, minimum fuel, position, the ram air enters combustor 16 solely through the interior of the tube.

As shown in FIG. 2, for intermediate positions and fuel flows, the ram air is proportionately split between the two paths of air flow, annulus 28 and the tube interior.

A pressure sensor 30 is shown mounted in the diffuser for sensing the air mass flow entering the engine at any given time and is electrically coupled to a servomotor driver 32 which conditions the signal generated by sensor 30 and drives a servomotor 34. Motor 34 is connected to translating tube 20 by a rod 36 and spokes 38. Appropriate gearing, not shown, converts the rotation of motor 34 into linear motion of rod 36 for extending and retracting tube 20 so as to continuously change the proportional split of air between the two paths in response to the sensor.

Increasing air mass flow, as sensed by sensor 30, causes the driver to drive the motor in a direction to extend tube 20 into the combustor chamber to decrease fuel flow. Conversely, decreasing air mass flow causes tube 20 to be retracted toward the position of FIG. 1 to increase fuel flow. In operation, the tube is positioned intermediate the maximum and minimum fuel positions and is continuously repositioned according to instantaneous air mass flow.

The servo system disclosed is representative of a typical system and those skilled in such systems can readily devise other means for moving the tube in response to changes in air mass flow. As mentioned, this invention contemplates that the fuel burn rate may be adjusted in response to conditions other than mass air flow, such as missile mach number, angle of attack, or engine variables, such as thrust, and the pressure sensor disclosed herein for sensing mass air flow is only representative of a typical system and are illustrative of one use and embodiment of the invention. Other sensors for sensing the other above mentioned conditions, are contemplated to be within the scope of the invention and those skilled in the art can also readily couple such other sensors to the motordriver to cause the translating tube to response in a desired manner for changing the fuel burn rate. The invention is therefore not to be considered limited to the system disclosed.

The invention takes advantage of the principle that the rate of solid fuel regression in a ramjet is a function of the aerodynamic shear interaction of the air flow over the burning surface. By changing the distribution of air within the combustor a variation in the aerodynamic shear interaction, and therefor in fuel flow, should occur. Under flight conditions of low air mass flow, with the tube in the retracted position of FIG. 1, all of the air is directed along and in close proximity to the fuel grain surface 15 which increases the aerodynamic shear interaction therebetween. The increased interaction increases the rate of burn and production of fuel combustion products. Consequently, the products entering combustion chamber 22 will be fuel rich.

As set out, increasing air mass flow causes tube 20 to extend into combustor 16 until at a predetermined air mass flow all of the air is caused to enter the combustor at a location further within the combustor and is directed centrally therethrough away from the fuel grain surface. This both decreases the amount of air that contacts grain surface 15, reducing aerodynamic shear, and reduces the time available for the air to interact with the fuel. Therefore, the burn rate of the fuel is reduced and the combustion products entering combustion chamber 22 will be less rich.

Intermediate positions of the translating tube, such as that of FIG. 2, adjusts the split of air to allow an appropriate amount of air, and time, to interact with the fuel so as to generate the desired quantity of fuel products for the instantaneous air mass flow.

Having described the preferred embodiment, other modifications and embodiments will readily come to the mind of those skilled in the art having the benefit of said description and the accompanying drawings. Therefore, said modifications and embodiments are to be considered within the scope of the appended claims.

What is claimed as new and desired to be secured by Letters Patent of the United States is:

1. A device for controlling the generation of fuel combustion products in a solid fuel ramjet engine propelled missile comprising:

a combustor chamber containing the solid fuel for generating the fuel combustion products, and having an inlet for admitting air thereinto, and an outlet for discharging the fuel combustion products generated;

sensor means for sensing air mass flow entering the inlet;

means operatively associated with said combustor chamber for continuously varying the aerodynamic shear interaction between the solid fuel and the air admitted into said combustor chamber;

said means comprising a tube located coaxially in the air inlet extending into said combustor chamber and defining a first path for air flow into said chamber between said tube and air inlet inner surface directed along and in close proximity to the solid fuel, and a second path for air flow into said chamber through said tube directed away from the solid fuel and centrally through said chamber, said tube positionable between a first position for causing all of the air to flow along the first path and a second position for causing all of the air to flow along the second path for continuously varying the split of air flow therebetween; and, a servomechanism electrically coupled to said sensor and mechanically connected to said tube for causing said tube to continuously translate and take positions in response to instantaneous air mass flow sensed by said sensor;

whereby the generation of the fuel combustion products is increased or decreased in response to changes in the sensed air mass flow.

2. The device as defined in claim 1 wherein said tube is expanded on one end for mating with an arcuate shaped section of an air diffuser in the engine for preventing flow of air along the second path when in the first position, the expanded end also being contiguous with the inner surface of said chamber inlet when in the second position for preventing air flow along the first path when in the second position.

3. A device for controlling generation of fuel combustion products in a solid fuel ramjet engine propelled missile comprising:

a combustor chamber containing the solid fuel for generating the fuel combustion products having an air inlet and a fuel combustion product outlet;

means in the air inlet for continuously sensing instantaneous air mass flow entering the inlet;

means positioned in the air inlet extending into said combustor chamber for continuously changing the aerodynamic shear interaction between the air and solid fuel by directing entering air into close proximity to or away from the solid fuel grain surface as a function of the instantaneous condition of the air mass flow entering the inlet as sensed by said means for sensing; and, means electrically coupled to said sensing means and mechanically connected to said means for changing the aerodynamic shear interaction for continuously positioning said aerodynamic shear interaction changing means within the inlet in response to the instantaneous condition.

4. The device as defined in claim 3 wherein the means for continuously sensing air mass flow is a pressure sensor.

5. The device as defined in claim 3 wherein said means for continuously changing the aerodynamic shear interaction comprises:

a tube mounted coaxially within the air inlet extending into said combustor chamber defining a first path for air flow into said chamber between said tube and air inlet inner surface directed along and in close proximity to the solid fuel, and a second path for air flow into said chamber through said tube directed away from the solid fuel and centrally through said chamber, said tube adapted to continuously translate between a first position for causing all of the air to flow along the first path and a second position for causing all of the air to flow along the second path and continuously vary the split of air flow therebetween.

6. The device as defined in claim 3 wherein said means for continuously positioning said aerodynamic shear interaction changing means comprises:

a motor driver electrically coupled to said means for sensing for receiving and conditioning a first signal therefrom and for generating a second signal in response thereto; and, a servomotor electrically coupled to said motor driver to receive the second signal therefrom and mechanically coupled to said means for changing the aerodynamic shear interaction for positioning said means for changing the aerodynamic shear interaction in response to the second signal.

7. The device as defined in claim 5 wherein said tube is expanded on one end for mating with an arcuate shaped section of an air diffuser in the engine for preventing flow of air along the second path when in the first position, the expanded end also being contiguous with the inner surface of said chamber inlet when in the second position for preventing flow of air along the first path when in the second position.

8. A fuel flow control device for use in a solid fuel ramjet engine comprising:

a chamber containing a solid fuel for generating fuel rich combustion products, said chamber having an inlet for admitting air thereinto and an outlet for discharging the fuel rich combustion products therefrom;

a sensor for continuously sensing instantaneous air mass flow into the chamber;

a translatable tube mounted coaxially in the air inlet defining an annulus between said tube and air inlet and extending into said chamber, said annulus defines a first path of air-flow into said chamber for directing the air along and in close proximity to the solid fuel to increase aerodynamic shear interaction therebetween, and said tube defines a second path of air-flow into said chamber for directing the air away from the solid fuel and centrally through said chamber to decrease aerodynamic shear interaction therebetween, said tube adapted for translation to positions within the inlet for changing the proportional split of air flow between the first and second paths as a function of the instantaneous air flow as sensed by said sensor; and, a servomechanism electrically coupled to said sensor and mechanically connected to said translatable tube for continuously positioning said tube within the inlet in response to the instantaneous air mass flow.

9. The device as defined in claim 8 wherein said tube is expanded on one end for mating with an arcuate shaped section of an air diffuser in the engine for directing all of the air flow along the first path when in a first maximum fuel position, the expanded end also being contiguous with the inner surface of said chamber inlet for directing all of the air flow along the second path when in a second minimum fuel position;

said tube adapted for splitting air proportionally between the paths when in positions intermediate the maximum and minimum fuel positions.

10. The device as defined in claim 8 wherein said servomechanism comprises:

a motor driver electrically coupled to said sensor for receiving and conditioning a first signal therefrom and for generating a second signal in response thereto; and, a servomotor electrically coupled to said motor driver to receive the second signal therefrom and mechanically coupled to said translating tube for positioning said tube in response to the second signal.

* * * * *